US010135351B2

United States Patent
Haji Moradi Javarsiani et al.

(10) Patent No.: US 10,135,351 B2
(45) Date of Patent: Nov. 20, 2018

(54) CIRCUIT AND METHOD FOR AC-TO-AC VOLTAGE CONVERSION

(71) Applicants: MohammadReza Haji Moradi Javarsiani, Tehran (IR); Hossein Mokhtari, Tehran (IR)

(72) Inventors: MohammadReza Haji Moradi Javarsiani, Tehran (IR); Hossein Mokhtari, Tehran (IR)

( * ) Notice: Subject to any disclaimer, the term of this patent is extended or adjusted under 35 U.S.C. 154(b) by 0 days.

(21) Appl. No.: 15/675,313

(22) Filed: Aug. 11, 2017

(65) Prior Publication Data

US 2017/0366095 A1 Dec. 21, 2017

Related U.S. Application Data

(60) Provisional application No. 62/373,369, filed on Aug. 11, 2016.

(51) Int. Cl.
*H02M 5/27* (2006.01)
*H02M 5/293* (2006.01)
*H02M 1/34* (2007.01)

(52) U.S. Cl.
CPC .............. *H02M 5/27* (2013.01); *H02M 5/293* (2013.01); *H02M 2001/346* (2013.01)

(58) Field of Classification Search
CPC ............ H02M 5/02; H02M 5/00; H02M 5/27; H02M 5/257; H02M 5/14; H02M 5/271; H02M 5/272; H02M 5/273; H02M 2/597; H02K 47/22; H01F 38/04; H01F 30/14; G01R 25/00; H03B 19/00; H03B 19/03

USPC ....................................... 363/1–12, 148–177
See application file for complete search history.

(56) References Cited

U.S. PATENT DOCUMENTS

| 8,289,010 | B1 | 10/2012 | Fernald et al. | |
|---|---|---|---|---|
| 8,730,700 | B2 | 5/2014 | Yuzurihara et al. | |
| 2013/0307463 | A1* | 11/2013 | Otsuka | H02M 5/293 318/800 |
| 2014/0293670 | A1* | 10/2014 | Robertson | H02M 7/537 363/131 |

OTHER PUBLICATIONS

Pfeifer, M., and G. Schroder, "New commutation method of a matrix converter." In Industrial Electronics, 2009. ISIE 2009. IEEE International Symposium on, pp. 1516-1519. IEEE, Jul. 2009.

(Continued)

*Primary Examiner* — Nguyen Tran
(74) *Attorney, Agent, or Firm* — NovoTechIP International PLLC

(57) ABSTRACT

A circuit and method for converting an input AC voltage of a source to an output AC voltage of a destination is disclosed. The circuit may include a main switch cell coupled to the source, a freewheeling switch cell coupled to the main switch cell, a first inductor coupled to the main switch cell, the freewheeling switch and the destination, and a second inductor coupled to the first inductor, the main switch cell, the freewheeling switch and the destination. The circuit may also include a plurality of current paths when at least one of the main switch cell and/or the freewheeling switch cell is on. In some implementations, the main switch cell and the freewheeling switch cell are controlled using a switching method.

19 Claims, 23 Drawing Sheets

(56) References Cited

OTHER PUBLICATIONS

N. Vazquez et al. "AC voltage regulator based on the AC-AC buck-boost converter." In Industrial Electronics, 2007. ISIE 2007. IEEE International Symposium on, pp. 533-537. IEEE, Jun. 2007.
Cristian Aghion et al. "Direct AC-AC step-down single-phase converter with improved performances." Elektronika in Elektrotechnika 18, No. 10 (2012): 33-36.
M. R. Hajimoradi et al. "Double stage switch mode AC voltage regulator." In Power Electronics, Drive Systems and Technologies Conference (PEDSTC), 2011 2nd, pp. 187-192. IEEE, Feb. 2011.

* cited by examiner

CIRCUIT AND METHOD FOR AC-TO-AC VOLTAGE CONVERSION

CROSS-REFERENCE TO RELATED APPLICATION

This application claims the benefit of priority from U.S. Provisional Patent Application Ser. No. 62/373,369, filed on Aug. 11, 2016, and entitled "AC BUCK CONVERTER," which is incorporated herein by reference in its entirety.

TECHNICAL FIELD

The present disclosure generally relates to electric power converters, and more specifically to an AC-to-AC voltage converter and its method of operation.

BACKGROUND

Typically, a controlled AC voltage is produced with indirect AC-DC-AC voltage conversion with the use of a DC link capacitor. An indirect AC-to-AC conversion uses more power switches; hence, has more loss and less efficiency than direct AC-to-AC conversion. Direct AC-to-AC conversion and removing the dc-link and its bulky electrolytic capacitor can lead to higher efficiency, lower cost, smaller size, longer life and increased reliability.

One of the most limiting factors in expanding the use of direct AC-to-AC converter-based power conditioning systems is the commutation problem. The commutation process is the procedure of turning off a main switch and turning on a freewheeling switch or vice versa. To overcome the commutation problem, several topologies have been introduced based on direct AC-to-AC conversion for an AC chopper. These topologies either use snubber circuits to avoid voltage spikes resulting from hard-switched power transistors or take advantage of resonant circuits or soft-switching (ZVS or ZCS). In some practices, selective switching based on current and voltage waveforms is proposed in which voltage or current sensors are needed to detect the polarity of the voltage and/or current.

All of the above solutions have their own restrictions. Using snubber circuits limits the output power of the converter, making it hard or impossible to use the snubber circuits at higher power levels due to the size and heat dissipation of the snubber elements. Direct AC-to-AC converters based on soft switching have some restrictions on the load power factor.

Performing selective switching patterns based on voltage/current polarity not only increases the cost, but can also affect the overall system reliability due to higher complexity and inaccuracy and may even result in failure due to noise and harmonic values especially when the amplitude of the signal is low.

Thus, there is a need for an improved direct AC-to-AC voltage converter that provides a current path in all switching states.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes circuits for converting an input AC voltage of a source to an output AC voltage of a destination. The circuit may include a main switch cell coupled to the source, a freewheeling switch cell coupled to the main switch cell, a first inductor coupled to the main switch cell, the freewheeling switch cell and the destination, and a second inductor coupled to the first inductor, the main switch cell, the freewheeling switch cell and the destination. The circuit may also include a plurality of current paths when at least one of the main switch cell and/or the freewheeling switch cell is on.

The above general aspect may include one or more of the following features. In an example implementation of the circuit, the plurality of current paths may include a first current path from the source to the destination, a second current path from the source to the destination, and a closed-loop current path. The first current path may include the main switch cell, the first inductor, and the second inductor. The first current path may be provided when the main switch cell is on and the freewheeling switch cell is off. The second current path may include the main switch cell, the freewheeling switch cell, the first inductor, and the second inductor. The second current path may be provided when the main switch cell is on and the freewheeling switch cell is on. The closed-loop current path may include the freewheeling switch cell, the first inductor, and the second inductor. The closed-loop current path may be provided when the main switch cell is off and the freewheeling switch cell is on.

In some implementations, positive electric currents may flow from the first inductor to the main switch cell and from the main switch cell to the second inductor, when the main switch cell is on and the freewheeling switch cell is off. In other configurations, positive electric currents flow may flow from the main switch cell to the second inductor and from the first inductor to the freewheeling switch cell, when the main switch cell is on, the freewheeling switch cell is on, and a positive electric current may flow from the source to the circuit. In some implementations, positive electric currents may flow from the freewheeling switch cell to the second inductor and from the first inductor to the main switch cell, when the main switch cell is on, the freewheeling switch cell is on, and a positive electric current flows from the circuit to the source. In some cases, positive electric currents may flow from the first inductor to the freewheeling switch cell and from the freewheeling switch cell to the second inductor, when the main switch cell is off and the freewheeling switch cell is on.

In an implementation, the main switch cell may include a first transistor, a first diode, a second diode, a third diode, and a fourth diode, and the freewheeling switch cell may include a second transistor, a fifth diode, a sixth diode, a seventh diode, and an eighth diode. In addition, the first current path may include the first diode, the second diode, the first transistor, and the fourth diode, when a positive electric current flows from the circuit to the destination. Furthermore, the first current path may include the second diode, the first transistor, the third diode, and the fourth diode, when a positive electric current flows from the destination to the circuit. In some implementations, the second current path may include the first diode, the first transistor, the fourth diode, the sixth diode, the second transistor, and the seventh diode, when a positive electric current flows from the source to the circuit. In addition, the second current path may include the second diode, the first transistor, the third diode, the fifth diode, the second transistor, and the eighth diode, when a positive electric current flows from the circuit to the source. In some cases, the closed-loop current path may include the fifth diode, the second transistor, the sixth diode, and the eighth diode, when a positive electric current flows from the circuit to the destination. In addition, the closed-loop current path may include the fifth diode, the second transistor, the sixth diode, and the seventh diode, when a positive electric current flows from the destination to the circuit.

In some implementations, the main switch cell and the freewheeling switch cell may be controlled using a switching method. The switching method may include turning on the main switch cell if the main switch cell is off and keeping the main switch cell on during a duty cycle while the freewheeling switch cell is off. The switching method may further include turning on the freewheeling switch cell and keeping the freewheeling switch cell on during a first overlap interval while the main switch cell is on. In addition, the switching method may involve turning off the main switch cell and keeping the main switch cell off during a freewheeling interval while the freewheeling switch cell is on. Furthermore, the switching method may include turning on the main switch cell and keeping the main switch cell on during a second overlap interval while the freewheeling switch cell is on. The switching method may further involve turning off the freewheeling switch cell while the main switch cell is on. The sum of the duty cycle, the first overlap interval, the freewheeling interval, and the second overlap interval may be kept equal to, or, larger than a stability threshold. The stability threshold may be calculated according to the voltage drop across the first transistor or the second transistor, as well as the voltage drop across the first diode, or the second diode, or the third diode, or the fourth diode, or the fifth diode, or the sixth diode, or the seventh diode, or the eighth diode, and the peak of the input AC voltage, as well as the duration of the first overlap interval, or the second overlap interval.

In another general aspect, the present disclosure describes a method for converting an input AC voltage to an output AC voltage in an AC converter circuit including a main switch and a freewheeling switch. The method may include turning on the main switch if the main switch is off and keeping the main switch on during a duty cycle while the freewheeling switch is off. The method may further include turning on the freewheeling switch and keeping the freewheeling switch on during a first overlap interval while the main switch is on. In addition, the method may involve turning off the main switch and keeping the main switch off during a freewheeling interval while the freewheeling switch is on. Furthermore, the switching method may include turning on the main switch and keeping the main switch on during a second overlap interval while the freewheeling switch is on. The method may further involve turning off the freewheeling switch while the main switch is on. The sum of the duty cycle, the first overlap interval, the freewheeling interval, and the second overlap interval may be kept equal to a stability threshold, or larger than the stability threshold. The stability threshold may be calculated according to the voltage drop across the main switch or the freewheeling switch, as well as the input AC voltage, and the duration of the first overlap interval, or the second overlap interval.

BRIEF DESCRIPTION OF THE DRAWINGS

The drawing figures depict one or more implementations, in accord with the present teachings, by way of example only, not by way of limitation. In the figures, like reference numerals refer to the same or similar elements.

FIG. 4A-4B are schematics illustrating two current paths in an implementation of the AC-to-AC voltage converter circuit when the main switch cell is on and the freewheeling switch cell is on.

FIG. 5 is a schematic illustrating a current path in an implementation of the AC-to-AC voltage converter circuit when the main switch cell is off and the freewheeling switch cell is on.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Figure 1:
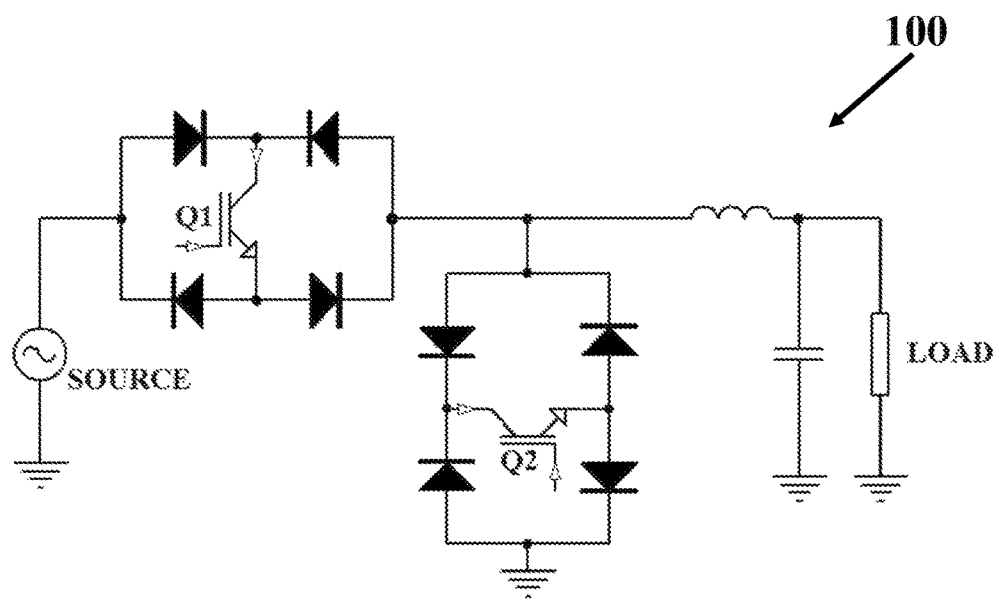
FIG. 1 is a schematic illustrating an example of one conventional direct AC-to-AC buck converter.

As mentioned earlier, an important limiting factor in expanding the use of direct AC-to-AC converter-based power conditioning systems is the problem of commutation. FIG. 1 illustrates a conventional direct AC-to-AC buck converter 100. In one implementation, because both voltage polarity and the direction of load current can change, 4-quadrant semiconductor switches are used. In general, in order to make sure that the current path of the inductor is always closed, at least one of Q1 or Q2 must be on at any instant. At the end of each duty cycle, when Q1 turns off and Q2 turns on, inserting a dead-time between the gating signals causes an open circuit in the inductor current path that leads to a voltage spike. On the other hand, overlapping the gating signals would lead to a short circuit among the source terminals that could create detrimental overcurrent surges.

Disclosed herein is an AC-to-AC voltage converter circuit and a method that provide current paths at all switching states. A structure for switching cells with appropriate connections to the converter circuit is also disclosed. The connections may facilitate providing the current paths at different switching states. In addition, a method for controlling the switch cells is disclosed that provides a stable voltage conversion.

Figure 2:
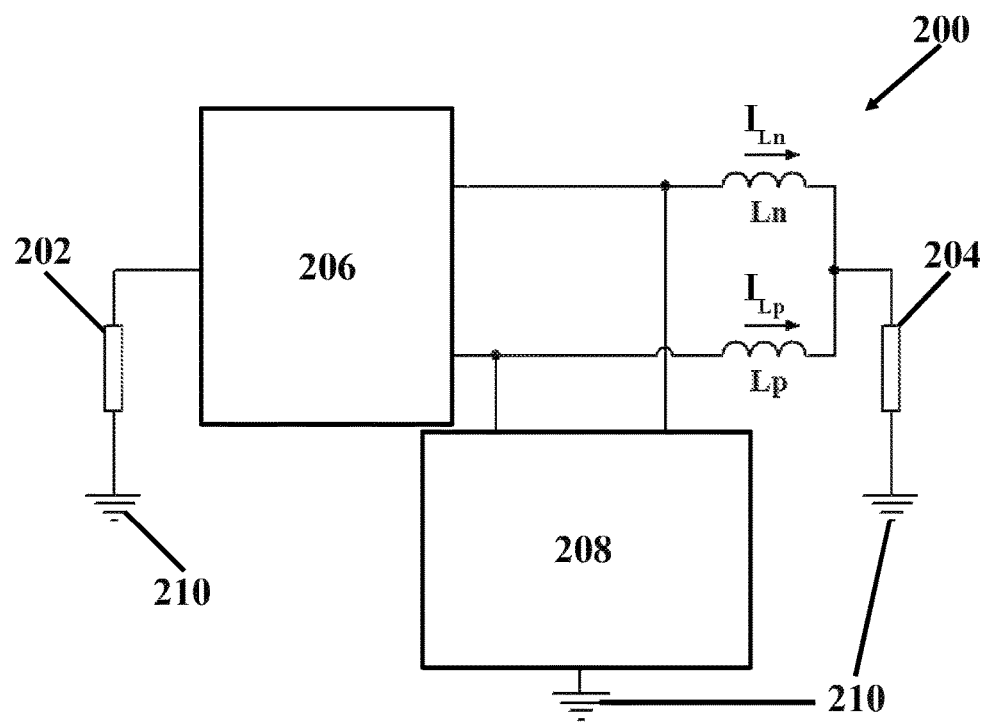
FIG. 2 is a schematic illustrating an implementation of an AC-to-AC voltage converter circuit with a main switch cell and a freewheeling switch cell.

For purposes of clarity, FIG. 2 shows an implementation of a circuit 200 for converting an input AC voltage of a source 202 to an output AC voltage of a destination 204. Some implementations of the circuit 200 may include a main switch cell 206, a freewheeling switch cell 208, a first inductor Ln, and a second inductor Lp. In some implementations, one end of each of the source 202, the destination 204, and the freewheeling switch cell 208 may be connected to a common node 210. In different implementations, the circuit 200 may include various current paths when at least one of the main switch cell 206 and the freewheeling switch cell 208 cell is on. In some implementations, the output power delivered to the destination 204 can be controlled by changing duty ratios of pulse-width modulation (PWM) pulses that are used to control the main switch cell 206 and/or the freewheeling switch cell 208. In different implementations of the circuit 200, the destination 204 may include resistive, inductive or capacitive loads.

Figure 3:
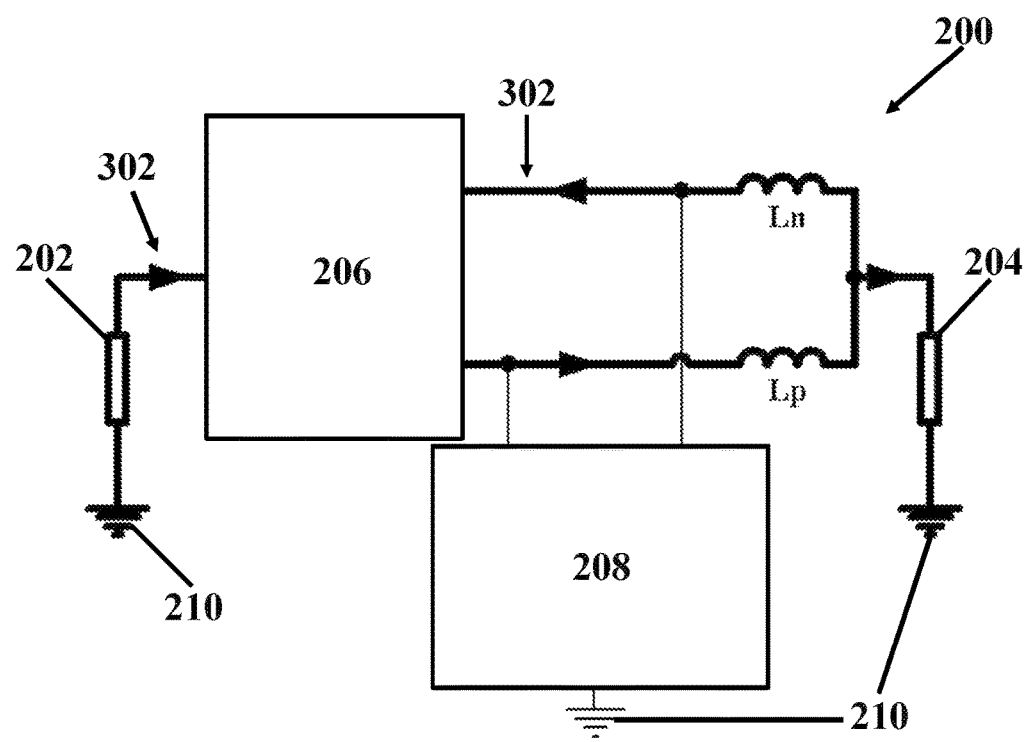
FIG. 3 is a schematic illustrating a current path in an implementation of the AC-to-AC voltage converter circuit when the main switch cell, is on and the freewheeling switch cell is off.
Figure 4A:
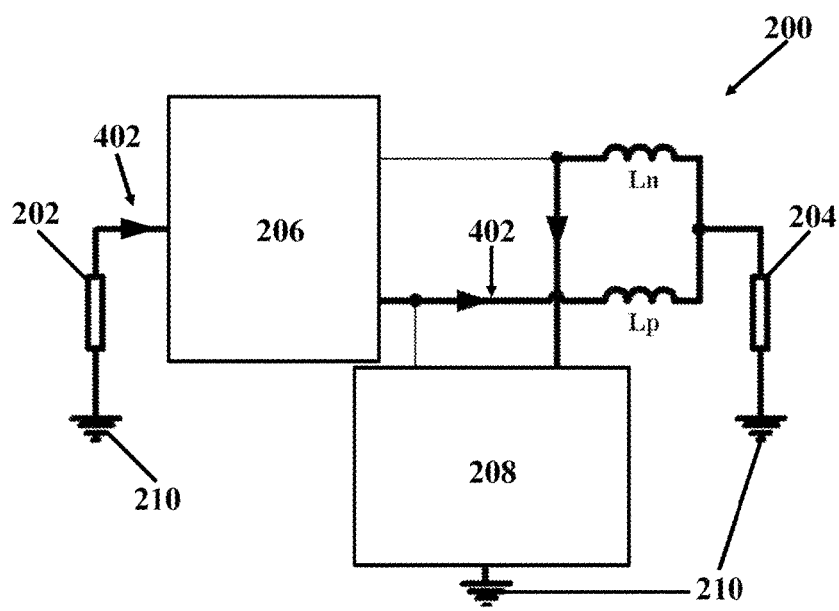
Figure 4B:
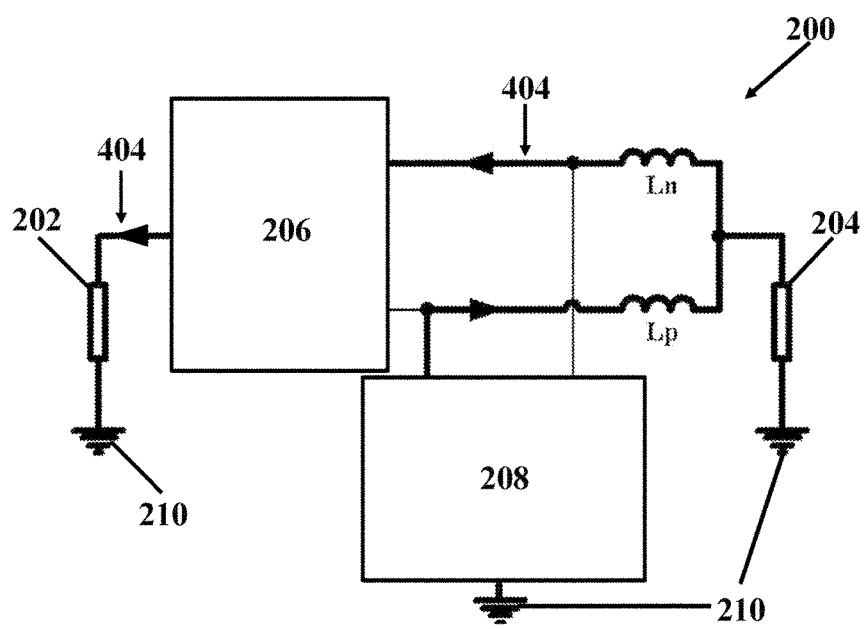
Figure 5:
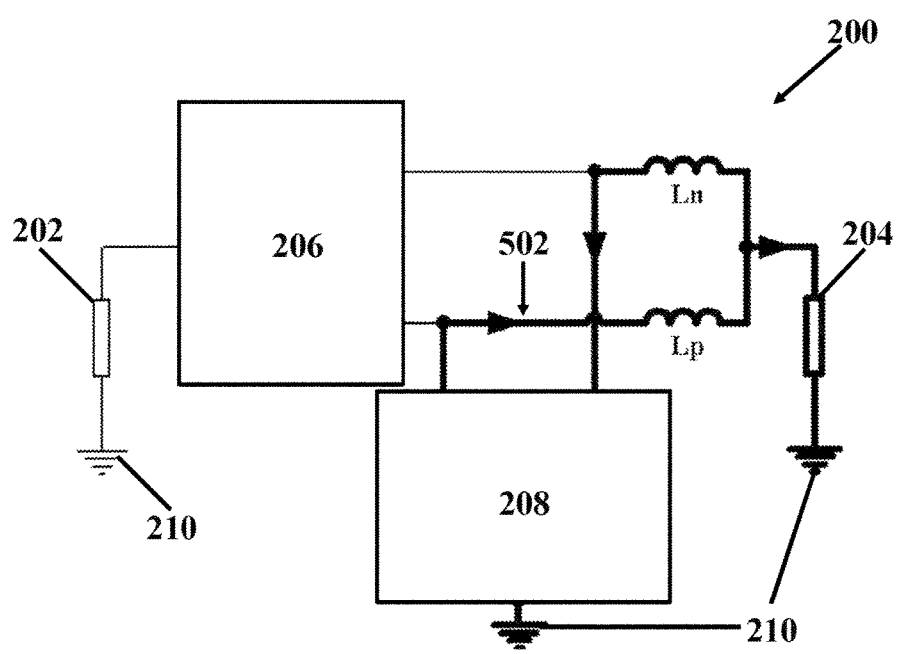

In order to better illustrate the current paths, FIGS. 3-5 depict a series of implementations of the circuit 200, in which different current paths (designated by bold arrows in FIGS. 3-5) are provided. FIG. 3 presents a first current path 302 from the source 202 to the destination 204 in one implementation of the circuit 200. In some implementations, the first current path may include the main switch cell 206, the first inductor Ln, and the second inductor Lp. Thus, the first current path may be provided when the main switch cell 206 is on and the freewheeling switch cell 208 is off. In some, implementations, positive electric currents flow from the first inductor Ln to the main switch cell 206, and from the main switch cell 206 to the second inductor Lp, when the first current path 302 is provided, that is, when the main switch cell is on and the freewheeling switch cell is off.

FIG. 4A presents an implementation of a second current path 402 from the source 202 to the destination 204 in another implementation of the circuit 200. In some implementations, the second current path 402 may include the main switch cell 206, the freewheeling switch cell 208, the first inductor Ln. and the second inductor Lp. In an implementation, the second current path 402 may be provided when both the main switch cell 206 and the freewheeling switch cell 208 are on. In some implementations, when a positive electric current flows from the source 202 to the circuit 200 of FIG. 4, positive electric current also flows from, the main switch cell 206 to the second inductor Lp, and from the first inductor Ln to the freewheeling switch cell 208, when both the main switch cell 206 and the freewheeling switch cell 208 are on. In other words, in some implementations of circuit 200, when the second current path 402 is provided and a positive electric current flows from the source 202 to the circuit 200, positive electric currents may flow from the main switch cell 206 to the second inductor Lp, and from the first inductor Ln to the freewheeling switch cell 208.

FIG. 4B depicts another implementation of the second current path 404 in an implementation of the circuit 200. In this implementation, positive electric currents may flow from the freewheeling switch cell 208 to the second inductor Lp, and from the first inductor Ln to the main switch cell 206, when the main switch cell 206 is on, the freewheeling switch cell 208 is on, and a positive electric current flows from the circuit 200 to the source 202. In other words, in some implementations of the circuit 200, when the second current path 404 is provided and a positive electric current flows from the circuit 200 to the source 202, positive electric currents may flow from the freewheeling switch cell 208 to the second inductor Lp, and from the first inductor Ln to the main switch cell 206.

FIG. 5 presents a closed-loop current path 502 in another implementation of the circuit 200. In some implementations, the closed-loop current path 502 may include the freewheeling switch cell 208, the first inductor Ln, and the second inductor Lp. Thus, the closed-loop current path 502 may be provided when the main switch cell 206 is off and the freewheeling switch cell 208 is on. In some implementations, positive electric current may flow from the first inductor Ln to the freewheeling switch cell 208 and from the freewheeling switch cell 208 to the second inductor Lp, when the main switch cell 206 is off and the freewheeling switch cell 208 is on. In other words, in an implementation of the circuit 200, when the closed-loop current path 502 is provided, positive electric current may flow from the first inductor Ln to the freewheeling switch cell 208, and from the freewheeling switch cell 208 to the second inductor Lp.

Figure 6:
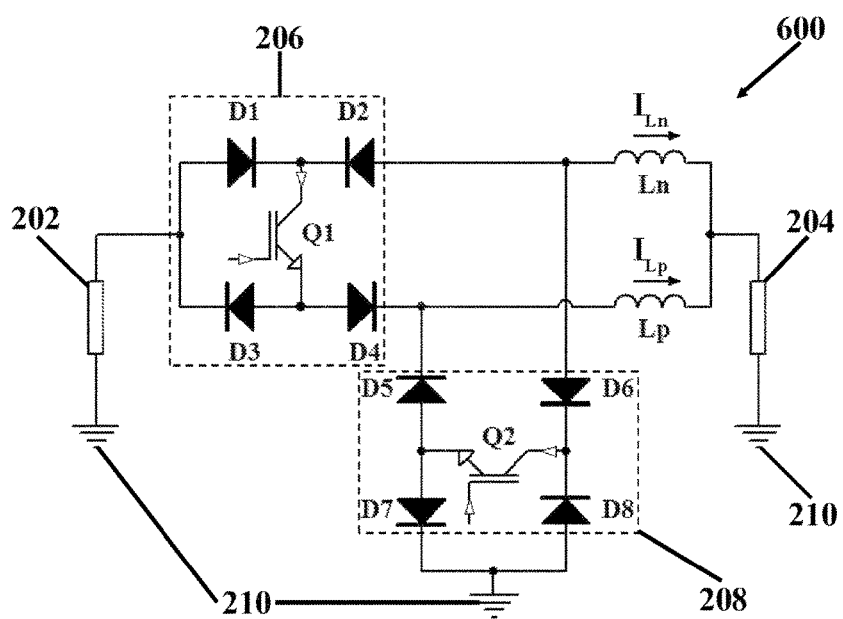
FIG. 6 is a schematic illustrating the structures of the main switch and the freewheeling switch in an implementation of the AC-to-AC voltage converter circuit.

FIG. 6 depicts another implementation of the circuit 200 represented by a circuit 600. In some implementations of the circuit 600, the main switch cell 206 may include a first transistor Q1, a first diode D1, a second diode D2, a third diode D3, and a fourth diode D4. Moreover, the freewheeling switch cell 208 may include a second transistor Q2, a fifth diode D5, a sixth diode D6, a seventh diode D7, and an eighth diode D8.

Figure 7A:
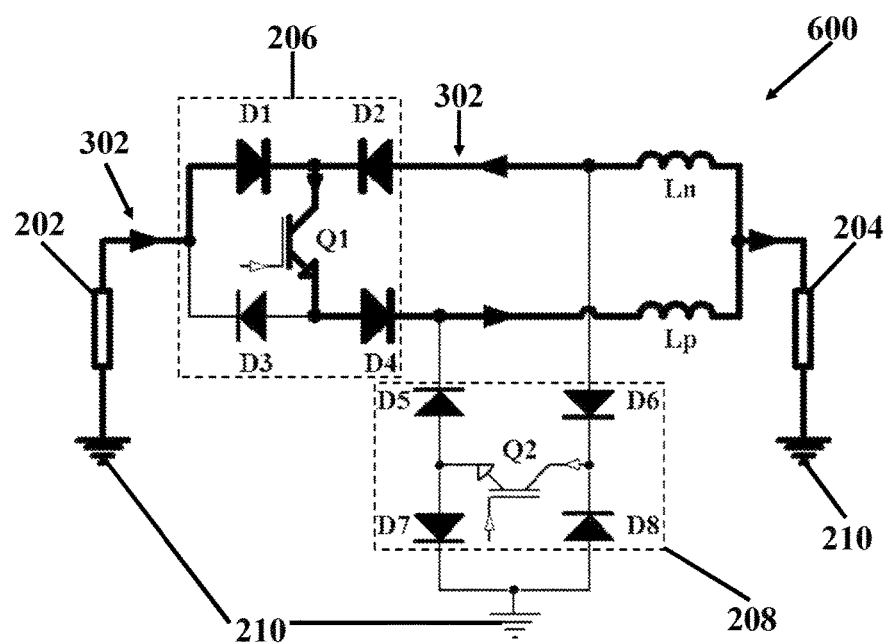
FIG. 7A is a schematic illustrating the elements of the main switch that are included in the current path in an implementation of the AC-to-AC voltage converter circuit, when the main switch cell is on, the freewheeling switch cell is off, and a positive electric current flows from the circuit to the destination.

In order to better illustrate the current paths, FIGS. 7-9 depict a series of implementations of the circuit 600, in which different current paths (shown by bold arrows in each figure) are shown. FIG. 7A presents an implementation of the first current path 302 in one implementation of the circuit 600. According to FIG. 7A, in some implementations, the first current path 302 may include the first diode D1, the second diode D2, the first transistor Q1, and the fourth diode D4, from the main switch cell 206, when a positive electric current flows from the circuit 600 to the destination 204. In an implementation of the circuit 600, when a positive electric current flows from the circuit 600 to the destination 204 and the first current path 302 is provided, a positive current may flow from the source 202 to the destination 204 through the first diode D1, the first transistor Q1, the fourth diode D4, and the second inductor Lp, within the first current path 302. In another implementation, when a positive electric current flows from the circuit 600 to the destination 204 and the first current path 302 is provided, a positive current may flow from the first inductor Ln to the second inductor Lp through the second diode D2, the first transistor Q1, and the fourth diode D4, within the first current path 302.

Figure 7B:
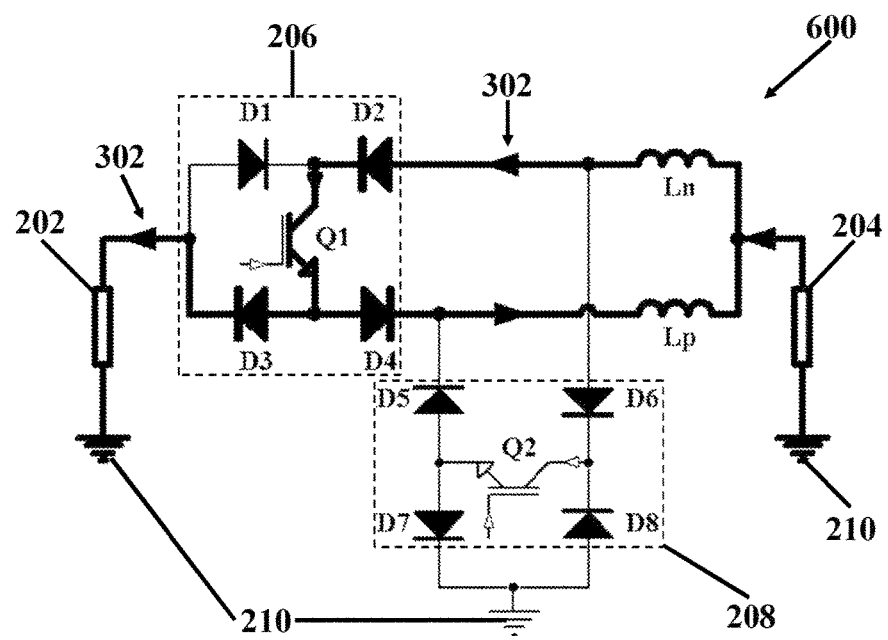
FIG. 7B is a schematic illustrating the elements of the main switch that are included in the current path in an implementation of the AC-to-AC voltage converter circuit, when the main switch cell is on, the freewheeling switch cell is off, and a positive electric current flows from the destination to the circuit.

FIG. 7B presents an implementation of the first current path 302 (shown in bold in the figure) in another implementation of the circuit 600. According to FIG. 7B, in some implementations, the first current path 302 may include the second diode D2, the first transistor Q1, the third diode D3, and the fourth diode D4, from the main switch cell 206, when a positive electric current flows from the destination 204 to the circuit 600. In an implementation of the circuit 600, when a positive electric current flows from the destination 204 to the circuit 600 and the first current path 302 is provided, a positive current may flow from the destination 204 to the source 202 through the first inductor Ln, the second diode D2, the first transistor Q1, and the third diode D3, within the first current path 302. In another implementation, when a positive electric current flows from the destination 204 to the circuit 600 and the first current path 302 is provided, a positive current may flow from the first inductor Ln to the second inductor Lp, by going from the first inductor Ln through the second diode D2, the first transistor Q1, and the fourth diode D4, within the first current path 3024.

Figure 8A:
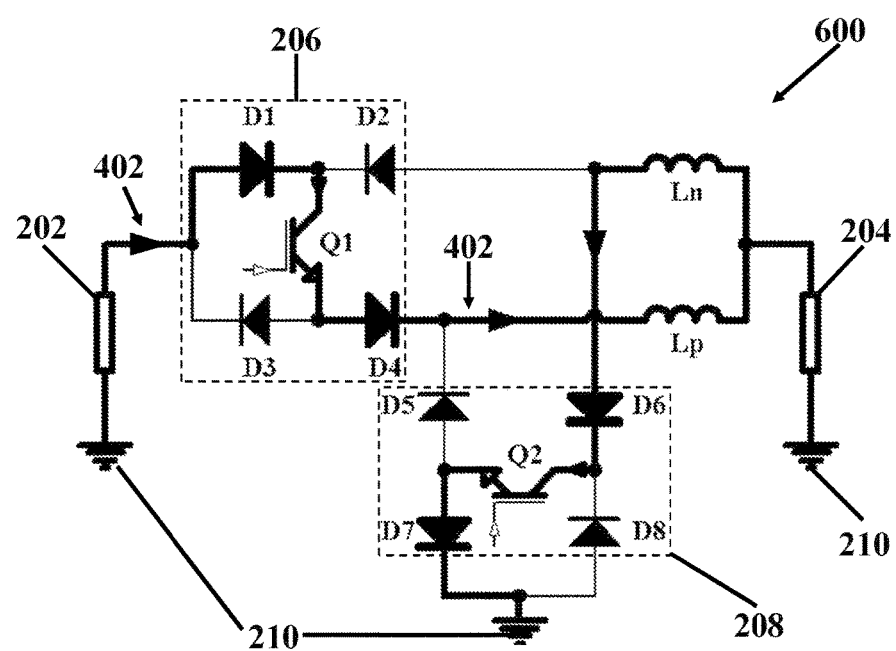
FIG. 8A is a schematic illustrating the elements of the main switch and the freewheeling switch that are included in the current path in an implementation of the AC-to-AC voltage converter circuit, when the main switch cell is on, the freewheeling switch cell is on, and a positive current flows from the source to the circuit.

FIG. 8A presents an implementation of the second current path 402 (shown by bold arrows in the figure) in another implementation of the circuit 600. According to FIG. 8A, in some implementations, the second current path 402 may include the first diode the first transistor Q1, and the fourth diode D4, from the main switch cell 206, and the sixth diode D6, the second transistor Q2, and the seventh diode D7, from the freewheeling switch cell 208, when a positive electric current flows from the source 202 to the circuit 600. In an implementation of the circuit 200, when a positive electric current flows from the source 202 to the circuit 600 and the second current path 402 is provided, a positive current may flow from the source 202 to the destination 204 through the first diode D1, the first transistor Q1, the fourth diode D4, and the second inductor Lp, within the second current path 402. In some implementations, when a positive electric current flows from the source 202 to the circuit 600 and the second current path 402 is provided, a positive current may flow from the source 202, through the first diode D1, the first transistor Q1, the fourth diode D4, the second inductor Lp, the first inductor Ln, the sixth diode D6, the second transistor Q2, and the seventh diode D7, to the common node 210, within, the second current path 402.

Figure 8B:
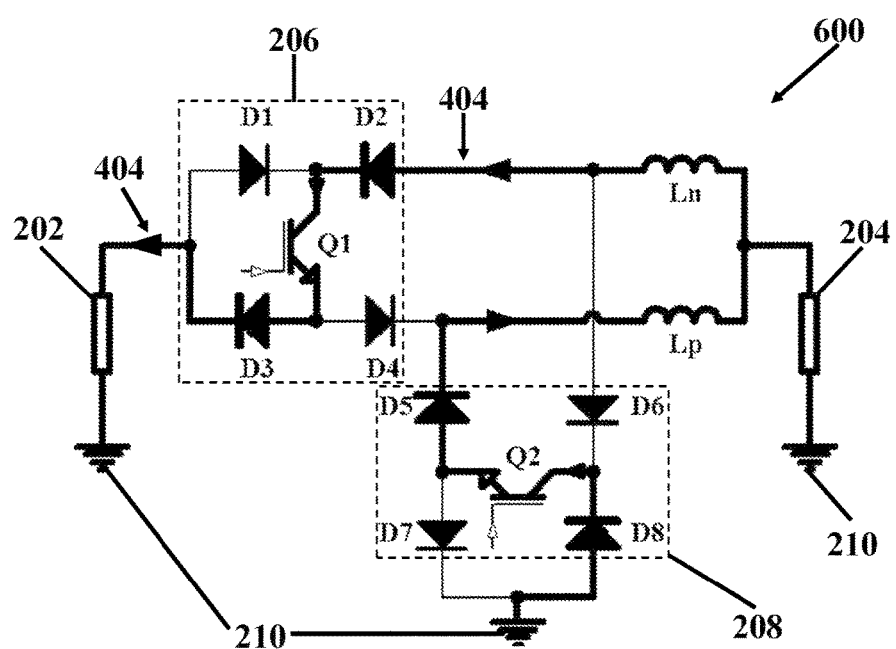
FIG. 8B is a schematic illustrating the elements of the main switch and the freewheeling switch that are included in the current path in an implementation of the AC-to-AC voltage converter circuit, when the main switch cell is on, the freewheeling switch cell is on, and a positive current flows from the circuit to the source.

FIG. 8B presents an implementation of the second current path 404 (shown in bold in the figure) in another implementation of the circuit 600. According to FIG. 8B, in some implementations, the second current path 404 may include the second diode D2, the first transistor Q1, and the third diode D3, from the main switch cell 206 and the fifth diode D5, the second transistor Q2, and the eighth diode D8, from the freewheeling switch cell 208, when a positive electric current flows from the circuit 600 to the source 202. In some implementations, when a positive electric current flows from the circuit 600 to the source 202 and the second current path 404 is provided, a positive current may flow from the destination 204 to the source 202 through the first inductor Ln, the second diode D2, the first, transistor Q1, and the third diode D3, within the second current path 404. In different implementations, when a positive electric current flows from the circuit 600 to the source 202 and the second current path 404 is provided, a positive current may flow from the common node 210, through the eighth diode D8, the second transistor Q2, the fifth diode D5, the second inductor Lp, the first inductor Ln, the second diode D2, the first transistor Q1, and the third diode D3, to the source 202, within the second current path 404.

Figure 9A:
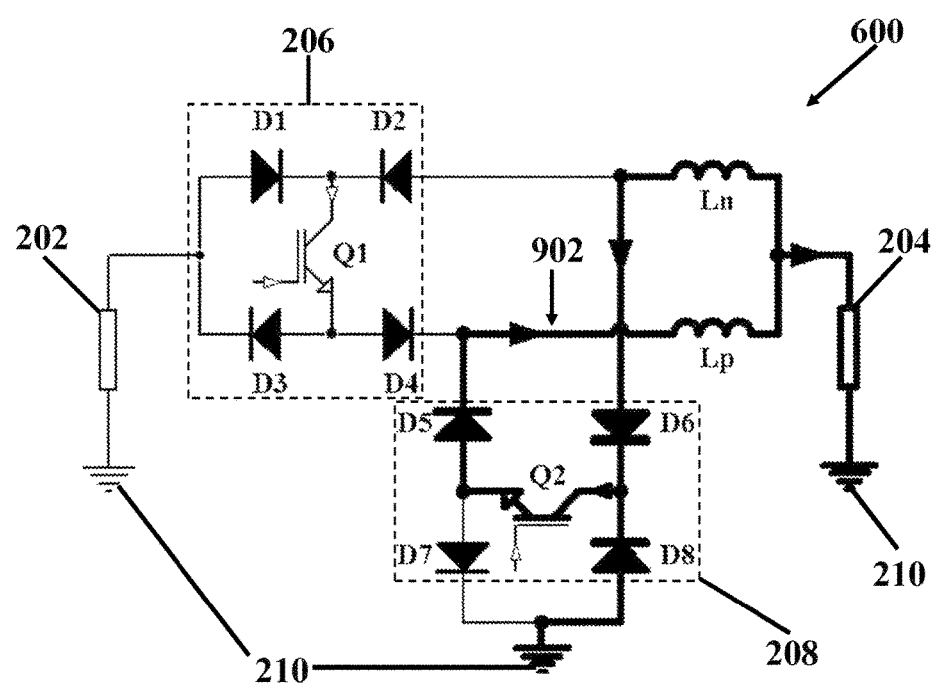
FIG. 9A is a schematic illustrating the elements of the freewheeling switch that are included in the current path in an implementation of the AC-to-AC voltage converter circuit, when the main switch cell is off, the freewheeling switch cell is on, and a positive current flows from the circuit to the destination.

FIG. 9A presents an implementation of the closed-loop current path 502 (shown by bold arrows) in another implementation of the circuit 600. According to FIG. 9A, in some implementations, the closed-loop current path 502 may include the fifth diode D5, the second transistor Q2, the sixth diode D6, and the eighth diode D8, from the freewheeling switch cell 208, when a positive electric current flows from the circuit 600 to the destination 204. In different implementations, when a positive electric current flows from the circuit 600 to the destination 204 and the closed-loop current path 502 is provided, a positive current may flow from the common node 210, through the eighth diode D8, the second transistor Q2, the fifth diode D5, and the second inductor Lp, to the destination 204, within the closed-loop current path 502. In some implementations, when the closed-loop current path 502 is provided, a positive current may flow from the first inductor Ln to the second inductor Lp by going through the sixth diode D6, the second transistor Q2, and the fifth diode D5, within the closed-loop current path 502.

Figure 9B:
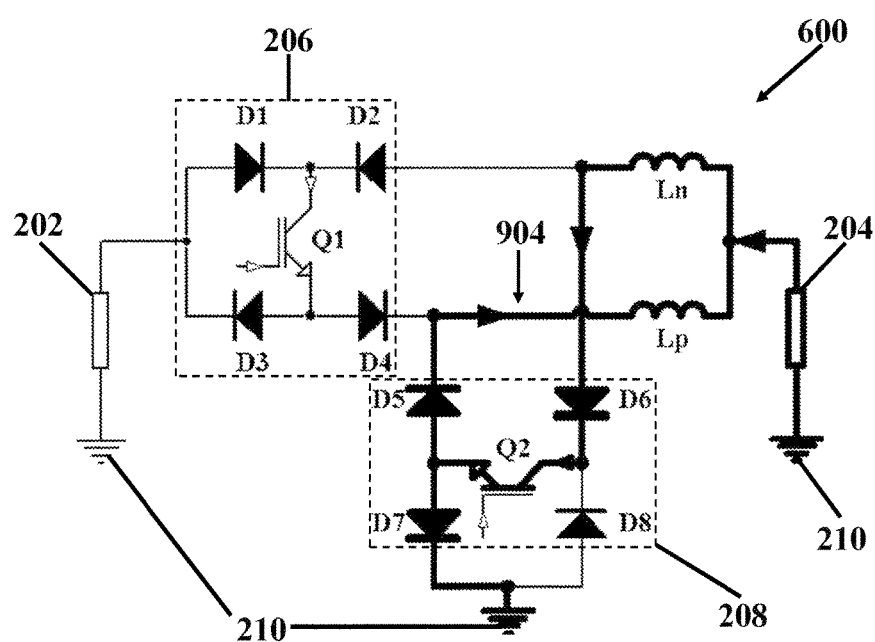
FIG. 9B is a schematic illustrating the elements of the freewheeling switch that are included in the current path in an implementation of the AC-to-AC voltage converter circuit, when the main switch cell is off, the freewheeling switch cell is on, and a positive current flows from the destination to the circuit.

FIG. 9B presents an implementation of the closed-loop current path 502 (shown in bold in the figure) in another implementation of the circuit 600. According to FIG. 9A, in some implementations, the closed-loop current path 502 may include the fifth diode D5, the second transistor Q2, the sixth diode D6, and the seventh diode D7, from the freewheeling switch cell 208, when a positive electric current flows from the destination 204 to the circuit 600. In different implementations, when a positive electric current flows from the destination 204 to the circuit 600 and the closed-loop current path 502 is provided, a positive current may flow from the destination 204, through the first inductor Ln, the sixth diode D6, the second transistor Q2, and the seventh diode D7, to the common node 210, within the closed-loop current path 502.

In some implementations, the main switch cell 206 and the freewheeling switch cell 208 of the circuit 200 or the circuit 600 may be controlled using a switching method including: turning on the main switch cell 206 if the main switch cell 206 is off and keeping the main switch cell 206 on during a duty cycle while the freewheeling switch cell 208 is off, turning on the freewheeling switch cell 208 and keeping the freewheeling switch cell 208 on during a first overlap interval while the main switch cell 206 is on, turning off the main switch cell 206 and keep the main switch cell 206 off during a freewheeling interval while the freewheeling switch cell 208 is on, turning on the main switch cell 206 and keep the main switch cell 206 on during a second overlap interval while the freewheeling switch cell 208 is on, and turning off the freewheeling switch cell 208 while the main switch cell 206 is on.

In some implementations of the circuit 200 or the circuit 600, the sum of the duty cycle, the first overlap interval, the freewheeling interval, and the second overlap interval may be kept equal to or larger than a stability threshold. In an implementation, the stability threshold may be calculated by the following equation:

$$T_{ST} = \frac{\left(\frac{4}{\pi}V_m - 2(V_Q + 2V_D)\right)T_{OVLP}}{V_Q + 2V_D} \quad (1)$$

where $T_{ST}$ is the stability threshold, $V_Q$ is a voltage drop across the first transistor Q1 or the second transistor Q2, $V_D$ is a voltage drop across any of the diodes (that is, the first diode D1, the second diode D2, the third diode D3, the fourth diode D4, the fifth diode D5, the sixth diode D6, the seventh diode D7, or the eighth diode D8), $V_m$ is a peak of the input AC voltage, and $T_{ovlp}$ is duration of the first overlap interval or the second overlap interval.

Figure 10:
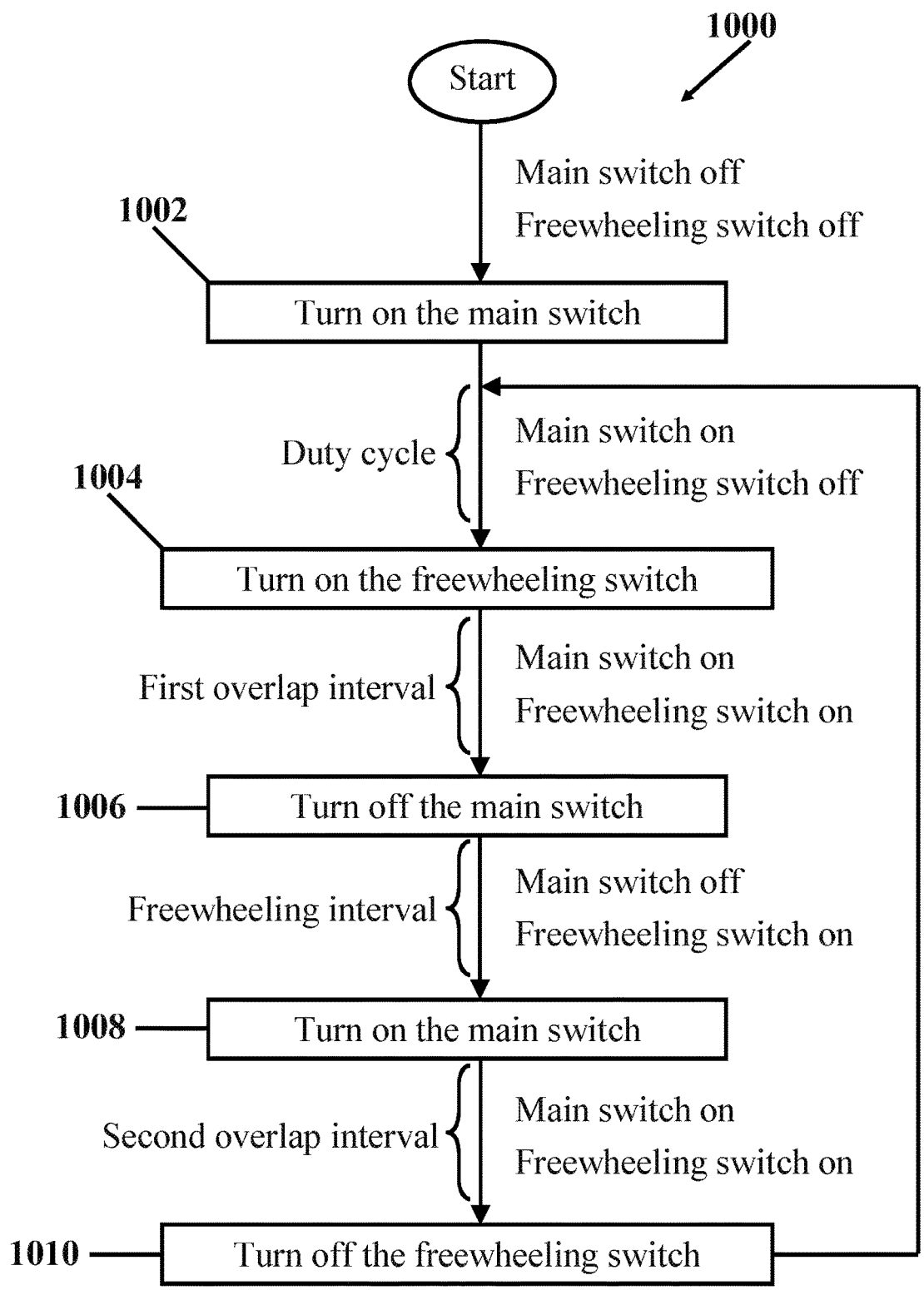
FIG. 10 is a flow chart illustrating an implementation of a method for converting an input AC voltage to an output AC voltage in an AC-to-AC voltage converter circuit.

FIG. 10 depicts a flowchart of an implementation of a method 1000 for converting an input AC voltage to an output AC voltage in an AC converter circuit, which may include an implementation of the circuit 200 or the circuit 600. In some implementations, the AC converter circuit may include a main switch and a freewheeling switch. In different implementations of the method 1000, the main switch and the freewheeling switch may be initially turned off before performing the method 1000. In an implementation, the method 1000 begins by turning on the main switch when the main switch is off and keeping the main switch on during a duty cycle while the freewheeling switch is off (step 1002), turning on the freewheeling switch and keeping the freewheeling switch on during a first overlap interval while the main switch is on (step 1004), turning off the main switch and keeping the main switch off during a freewheeling interval while the freewheeling switch is on (step 1006), turning on the main switch and keeping the main switch on during a second overlap interval while the freewheeling switch is on (step 1008), and turning off the freewheeling switch while the main switch is on (step 1010).

In some implementations, the method 1000 may repeat from step 1002 after step 1010 is performed. The sum of the duty cycle, the first overlap interval, the freewheeling interval, and the second overlap interval may be referred to herein as the switching period. In an implementation, the switching period may be kept equal to or larger than the stability threshold. In some implementations of the method 1000, the stability threshold may be calculated by the following equation:

$$T_{ST} = \frac{\left(\frac{4}{\pi}V_m - 2V_S\right)T_{OVLP}}{V_S} \quad (2)$$

where $T_{ST}$ is the stability threshold, $V_S$ is a switch voltage drop that may be calculated according to a main switch structure or a freewheeling switch structure, $V_m$ is a peak of the input AC voltage and $T_{ovlp}$ is a duration of the first overlap interval or the second overlap interval.

Example 1: AC Buck Converter

Figure 11:
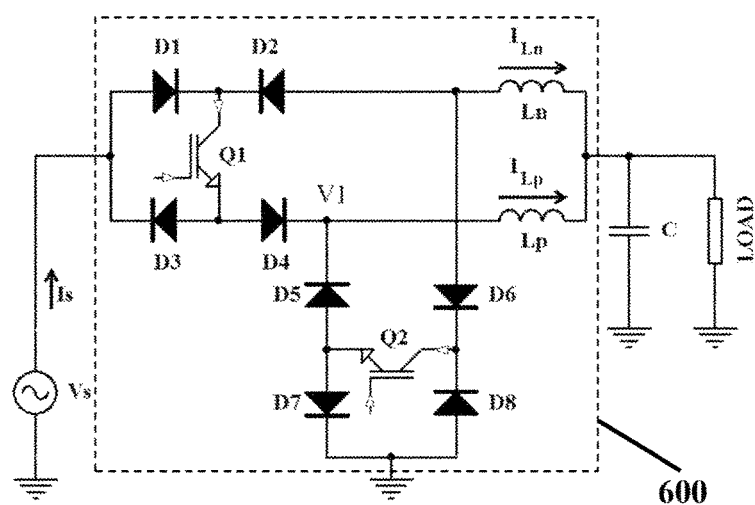
FIG. 11 is a schematic illustrating an implementation of the AC-to-AC voltage converter circuit that can be used as an AC buck converter.

Referring to FIG. 11, an implementation of the circuit 600 can be used as an AC buck converter, in which the amplitude of the output voltage is in the range of 0 up to that of the input voltage. In one implementation, the output frequency is the same as the input and the load can be resistive, inductive or capacitive.

Figure 12:
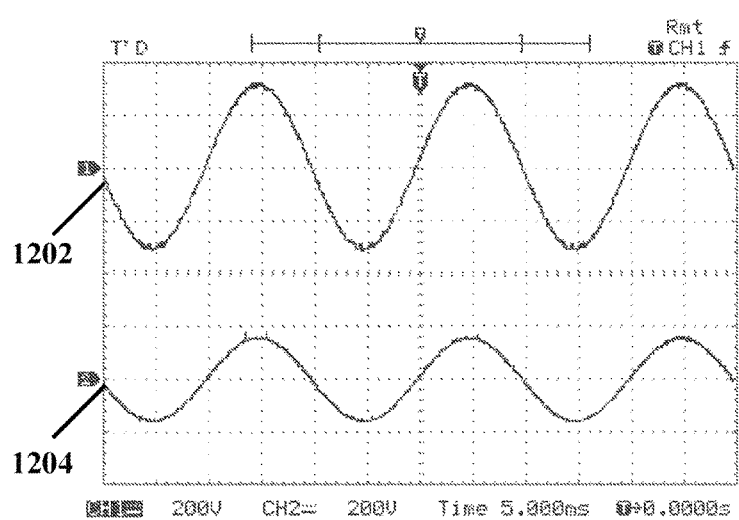
FIG. 12 is a graph illustrating variations in the input voltage and output voltage in an implementation of the AC-to-AC voltage converter circuit that is used as an AC buck converter.

FIG. 12 represents an exemplary result for the conversion ratio with about 50% duty ratio. In one implementation, when the source voltage 1202 is about 220V, the output voltage 1204 is about 109V, which is in agreement with the buck converter conversion ratio.

Figure 13A:
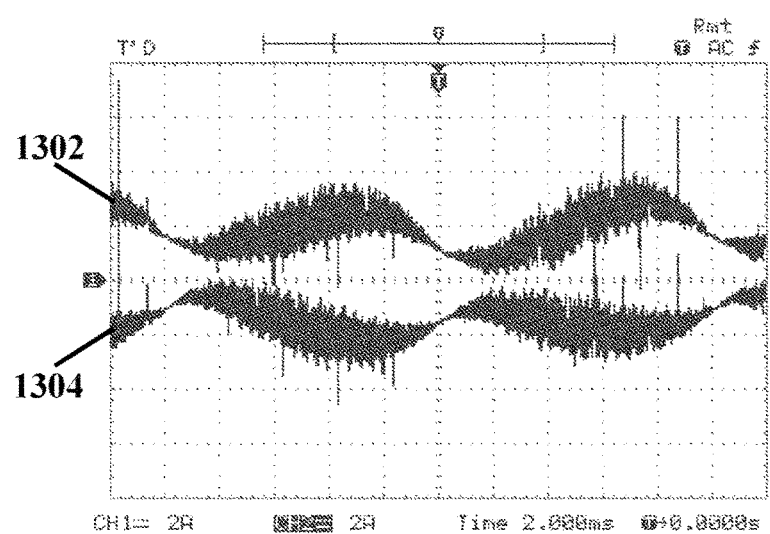
FIG. 13A is a graph illustrating variations in the inductor currents in an implementation of the AC-to-AC voltage converter circuit that is used as an AC buck converter, when the system is run at no-load.
Figure 13B:
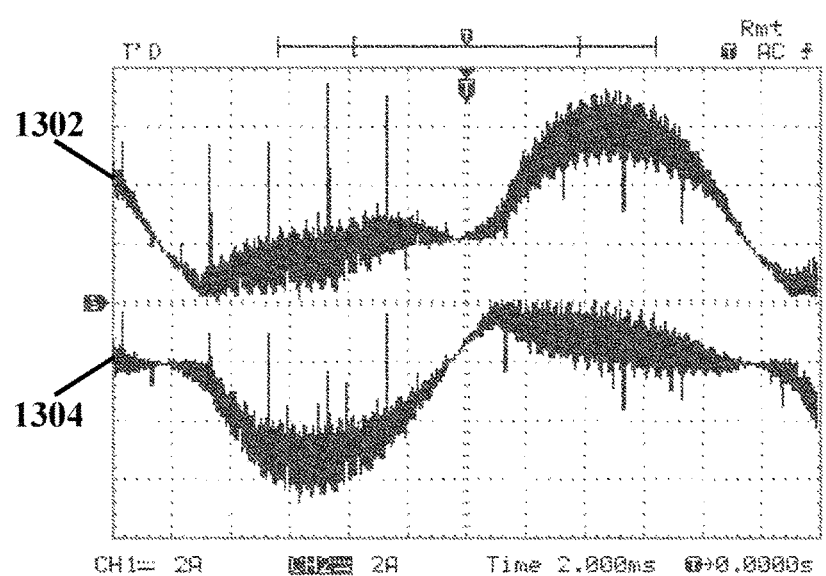
FIG. 13B is a graph illustrating variations in the inductor currents in an implementation of the AC-to-AC voltage converter circuit that is used as an AC buck converter, for a 35.5Ω resistive load.

FIGS. 13A and 13B present variations the first current 1302 of the first inductor Ln and the second current 1304 of the second inductor Lp for this example. In FIG. 13A, the system is run at no-load, and in FIG. 13B, a 35.5Ω resistive load is connected to the destination 204.

Example 2: Full-Bridle AC Inverter

Figure 14:
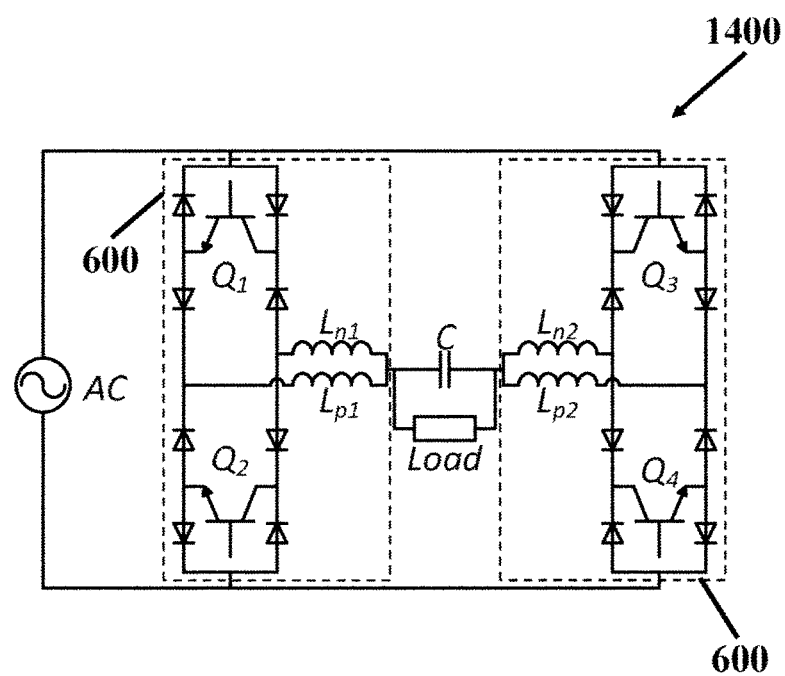
FIG. 14 is a schematic illustrating an implementation of a full-bridge AC inverter that includes two implementations of the AC-to-AC voltage converter circuit.

FIG. 14 illustrates two implementations of the circuit 600 that are used in an example full-bridge AC inverter circuit 1400. Each implementation of the circuit 600 forms a leg of the full-bridge AC inverter circuit 1400. In this example, the direction of the load voltage can be inverted by proper variation of the duty ratio of PWM pulses of each leg. The full-bridge AC inverter circuit 1400 can be used in various applications, such as voltage restoration, AC voltage rectification, and amplitude and frequency control.

Figure 15:
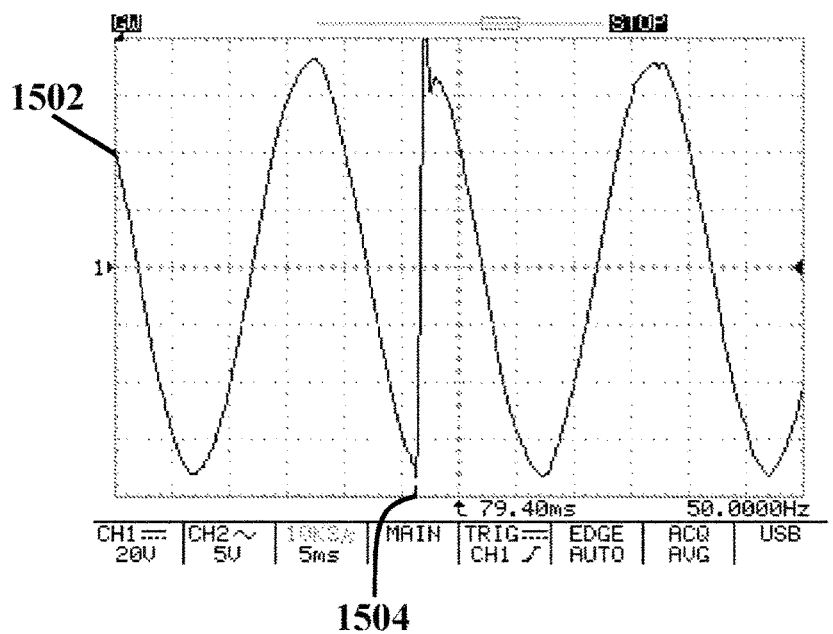
FIG. 15 is a graph illustrating variations in the load voltage in one implementation of a full-bridge AC inverter.

FIG. 15 presents variations of the load voltage 1502 in an implementation of the full-bridge AC inverter circuit 1400. In this example, the values of the first inductor Ln and the second inductor Lp of each leg were set to about 500 μH. The capacitor C was set to 10 μF, the load resistance was set to about 440Ω, and the amplitude of the input AC voltage was set to 100 v. At the beginning of the experiment, the duty ratios of the left and right legs were set 0.5 and 0, respectively. Then, both were simultaneously reset to zero. After about 1 ms, the duty ratio of the right leg was set to about 0.5, whereas the duty ratio of the left leg remained 0. FIG. 15 illustrates the sign inversion of the load voltage 1502 at the moment 1504.

Example 3: Dynamic Voltage Restorer

Figure 16:
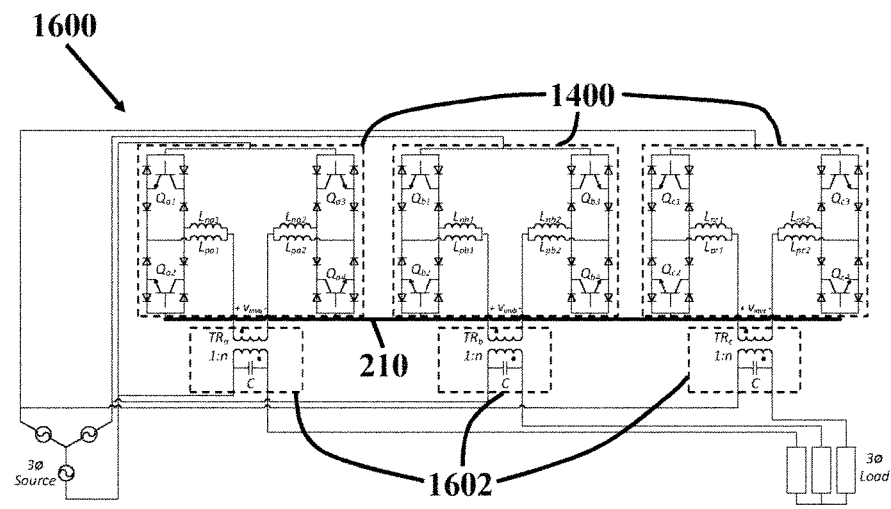
FIG. 16 is a schematic illustrating an implementation of a dynamic voltage restorer circuit that includes three implementations of the full-bridge AC inverter.

FIG. 16 illustrates three implementations of the full-bridge AC inverter circuit 1400 that are used in a dynamic voltage restorer circuit 1600. All of the three implementations of the full-bridge AC inverter circuit 1400 are connected to the common node 210. The output of each full-bridge AC inverter circuit 1400 is connected to the primary winding of a transformer 1602. The secondary winding of each transformer 1602 is connected in series to one phase of a three-phase source. By proper variation of the duty ratios of PWM pulses of the legs in each implementation of the full-bridge AC inverter circuit 1400, undesired variations of the input voltage can be compensated and the output voltage can be maintained at the desired nominal values.

Figure 17A:
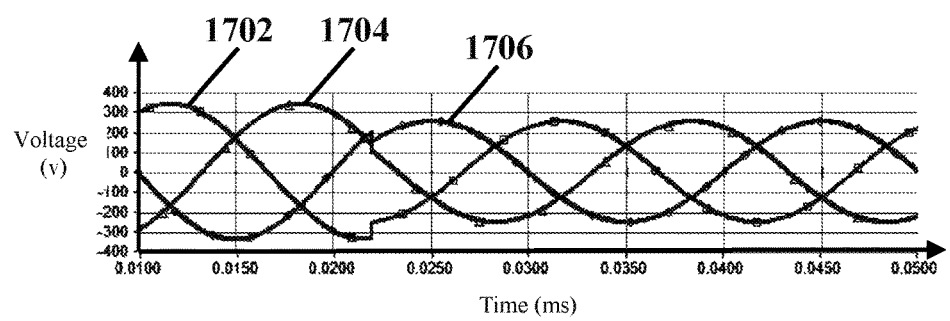
FIG. 17A is a graph illustrating variations of each of a three-phase input voltages in the implementation of the dynamic voltage restorer circuit.
Figure 17B:
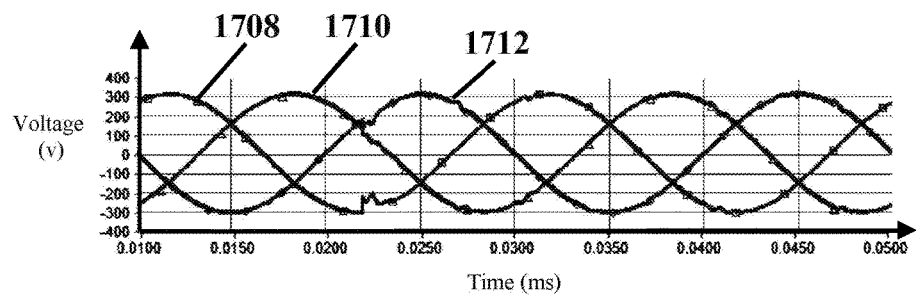
FIG. 17B is a graph illustrating variations in three-phase output voltages in the implementation of the dynamic voltage restorer circuit.

FIGS. 17A and 17B illustrates a graph showing variations in input voltages in an implementation of the dynamic voltage restorer circuit 1600. Referring to FIG. 17A, the amplitudes of the first phase input voltage 1702, the second input voltage phase 1704, and the third input voltage phase 1706 are decreased over time. FIG. 17B illustrates a graph showing variations of the first phase output voltage 1708, the second output voltage phase 1710, and the third output voltage phase 1712. As illustrated in FIG. 17B, the amplitudes of the output voltages are preserved as the time passes, that is, the decrease in the input voltage amplitudes is restored in the output voltages.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in they claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A circuit for converting an input AC voltage of a source to an output AC voltage of a destination, comprising:
   a main switch cell coupled to the source;
   a freewheeling switch cell coupled to the main switch cell;
   a first inductor coupled to the main switch cell, the freewheeling switch cell and the destination; and
   a second inductor coupled to the first inductor, the main switch cell, the freewheeling switch cell and the destination;

wherein the main switch cell and the freewheeling switch cell are controlled using a switching method, the switching method comprising:

turning on the main switch and keeping the main switch on during a duty cycle while the freewheeling switch is off;

turning on the freewheeling switch and keeping the freewheeling switch on during a first overlap interval while the main switch is on;

turning off the main switch and keeping the main switch off during a freewheeling interval while the freewheeling switch is on;

turning on the main switch and keeping the main switch on during a second overlap interval while the freewheeling switch is on; and turning off the freewheeling switch after the second overlap interval while the main switch is on, wherein the sum of the duty cycle, the first overlap interval, the freewheeling interval, and the second overlap interval is kept equal to a stability threshold, or larger than the stability threshold, and wherein the stability threshold is calculated by an operation defined by the following:

$$T_{ST} = \frac{\left(\frac{4}{\pi}V_m - 2V_S\right)T_{OVLP}}{V_S}$$

where $T_{ST}$ is the stability threshold, $V_S$ is a switch voltage drop that is calculated according to a main switch structure or a freewheeling switch structure, $V_m$ is a peak of the input AC voltage and $T_{ovlp}$ is duration of the first overlap interval or the second overlap interval.

2. The circuit of claim 1, wherein the circuit is configured to provide a plurality of current paths when at least one of the main switch cell or the freewheeling switch cell is on.

3. The circuit of claim 2, wherein the plurality of current paths comprise:

a first current path from the source to the destination, comprising the main switch cell, the first inductor, and the second inductor, wherein the first current path is provided when the main switch cell is on and the freewheeling switch cell is off;

a second current path from the source to the destination, comprising the main switch cell, the freewheeling switch cell, the first inductor, and the second inductor, wherein the second current path is provided when the main switch cell is on and the freewheeling switch cell is on; and a closed-loop current path, comprising the freewheeling switch cell, the first inductor, and the second inductor, wherein the closed-loop current path is provided when the main switch cell is off and the freewheeling switch cell is on.

4. The circuit of claim 2, wherein positive electric current flows from the first inductor to the main switch cell and from the main switch cell to the second inductor, when the main switch cell is on and the freewheeling switch cell is off.

5. The circuit of claim 2, wherein positive electric current flows from the main switch cell to the second inductor and from the first inductor to the freewheeling switch cell, when the main switch cell is on, the freewheeling switch cell is on, and the positive electric current flows from the source to the circuit.

6. The circuit of claim 2, wherein positive electric current flows from the freewheeling switch cell to the second inductor and from the first inductor to the main switch cell, when the main switch cell is on, the freewheeling switch cell is on, and the positive electric current flows from the circuit to the source.

7. The circuit of claim 2, wherein positive electric current flows from the first inductor to the freewheeling switch cell and from the freewheeling switch cell to the second inductor, when the main switch cell is off and the freewheeling switch cell is on.

8. The circuit of claim 3, wherein the main switch cell comprises a first transistor, a first diode, a second diode, a third diode, and a fourth diode, and the freewheeling switch cell comprises a second transistor, a fifth diode, a sixth diode, a seventh diode, and an eighth diode.

9. The circuit of claim 8, wherein the first current path comprises the first diode, the second diode, the first transistor, and the fourth diode, when a positive electric current flows from the circuit to the destination.

10. The circuit of claim 8, wherein the first current path comprises the second diode, the first transistor, the third diode, and the fourth diode, when a positive electric current flows from the destination to the circuit.

11. The circuit of claim 8, wherein the second current path comprises the first diode, the first transistor, the fourth diode, the sixth diode, the second transistor, and the seventh diode, when a positive electric current flows from the source to the circuit.

12. The circuit of claim 8, wherein the second current path comprises the second diode, the first transistor, the third diode, the fifth diode, the second transistor, and the eighth diode, when a positive electric current flows from the circuit to the source.

13. The circuit of claim 8, wherein the closed-loop current path comprises the fifth diode, the second transistor, the sixth diode, and the eighth diode, when a positive electric current flows from the circuit to the destination.

14. The circuit of claim 8, wherein the closed-loop current path comprises the fifth diode, the second transistor, the sixth diode, and the seventh diode, when a positive electric current flows from the destination to the circuit.

15. The circuit of claim 8, wherein the switch voltage drop Vs is calculated by an operation defined by the following:

$$V_S = V_Q + 2V_D$$

where $V_Q$ is a voltage drop across the first transistor, or the second transistor, and $V_D$ is a voltage drop across the first diode, or the second diode, or the third diode, or the fourth diode, or the fifth diode, or the sixth diode, or the seventh diode, or the eighth diode.

16. A method for converting an input AC voltage to an output AC voltage in an AC converter circuit including a main switch and a freewheeling switch, comprising:

turning on the main switch and keeping the main switch on during a duty cycle while the freewheeling switch is off;

turning on the freewheeling switch and keeping the freewheeling switch on during a first overlap interval while the main switch is on;

turning off the main switch and keeping the main switch off during a freewheeling interval while the freewheeling switch is on;

turning on the main switch and keeping the main switch on during a second overlap interval while the freewheeling switch is on; and turning off the freewheeling switch after the second overlap interval while the main switch is on;

wherein the sum of the duty cycle, the first overlap interval, the freewheeling interval, and the second overlap interval is kept equal to a stability threshold, or larger than the stability threshold, and wherein the stability threshold calculated by an operation defined by the following:

$$T_{ST} = \frac{\left(\frac{4}{\pi}V_m - 2V_S\right)T_{OVLP}}{V_S}$$

where $T_{ST}$ is the stability threshold, $V_S$ is a switch voltage drop that is calculated according to a main switch structure or a freewheeling switch structure, $V_m$ is a peak of the input AC voltage and $T_{ovlp}$ is duration of the first overlap interval or the second overlap interval.

17. The method of claim 16, wherein the AC converter circuit further comprises a first inductor, and a second inductor, and provides a plurality of current paths when at least one of the main switch cell or the freewheeling switch cell is on.

18. The method of claim 17, wherein positive electric current flows from the first inductor to the main switch cell and from the main switch cell to the second inductor, when the main switch cell is on and the freewheeling switch cell is off.

19. The method of claim 17, wherein positive electric current flows from the main switch cell to the second inductor and from the first inductor to the freewheeling switch cell, when the main switch cell is on, the freewheeling switch cell is on, and the positive electric current flows from the source to the circuit.

* * * * *